(12) United States Patent
Poller

(10) Patent No.: US 7,105,791 B1
(45) Date of Patent: Sep. 12, 2006

(54) ORBITAL DEBRIS DETECTION AND TRACKING SYSTEM UTILIZING SUN OR MOON OCCLUSION

(76) Inventor: Brian Poller, 6217 Castlegate Dr., W. #1633, Castle Rock, CO (US) 80108

( * ) Notice: Subject to any disclaimer, the term of this patent is extended or adjusted under 35 U.S.C. 154(b) by 0 days.

(21) Appl. No.: 10/970,045

(22) Filed: Oct. 20, 2004

(51) Int. Cl.
G01S 17/66 (2006.01)

(52) U.S. Cl. .............................. 250/203.1; 250/206.1; 250/206.2

(58) Field of Classification Search ............. 250/203.1, 250/203.3, 203.4, 203.6, 206.1, 206.2; 356/139.01, 356/29; 244/3.16–3.18, 171; 126/572–608; 136/246, 259; 701/13, 226, 300–302
See application file for complete search history.

(56) References Cited

U.S. PATENT DOCUMENTS

| 5,153,407 A | 10/1992 | Schall |
| 5,405,108 A | 4/1995 | Marin, Jr. et al. |
| 5,410,143 A | 4/1995 | Jones |
| 5,512,743 A | 4/1996 | Shaffer et al. |
| 5,745,869 A | 4/1998 | van Bezooijen |
| 6,133,997 A | 10/2000 | Yamawaki et al. |

FOREIGN PATENT DOCUMENTS

| EP | 1168003 A1 * | 1/2002 |
| FR | 002769991 A1 | 4/1999 |
| US | 2003/0095302 A1 | 5/2003 |
| US | 2003/0202682 A1 | 10/2003 |

OTHER PUBLICATIONS

A. Nakajima et al.; "Space Debris Observation by Ground-Based Optical Telescopes"; Japan Society for Aeronautical and Space Sciences and ISTS; pp. 2055-2060; 2000.*

Leu, Jia-Guu; "A Computer Vision Process to Detect and Track Space Debris Using Ground-Based Optical Telephoto Images", IEEE; pp. 522-525; 1992.*

* cited by examiner

Primary Examiner—Stephone B. Allen
Assistant Examiner—Davienne Monbleau
(74) Attorney, Agent, or Firm—Ramon L. Pizarro; Edwin H. Crabtree

(57) ABSTRACT

A system for using an image of the Sun for detecting objects traveling through Earth's atmosphere is disclosed. The system includes a receiver for collecting incident sunlight (solar energy) and a light sensitive device that produces a signal in response to exposure to light. A signal processor that is coupled to the light sensitive device, the signal processor sensing the collected incident sunlight and is programmed for providing an output signal corresponding to provide a detection signal in response to a shadow that moves across the light sensitive device.

13 Claims, 11 Drawing Sheets

Known Area-Error Detection on a Single 4-bit Pixel

4/16 bit detection

ORBITAL DEBRIS DETECTION AND TRACKING SYSTEM UTILIZING SUN OR MOON OCCLUSION

ORBITAL DEBRIS DETECTION AND TRACKING SYSTEM UTILIZING SUN OR MOON OCCLUSION

BACKGROUND OF THE INVENTION (a) Field of the Invention

This invention generally relates to a system and method for detecting and tracking objects orbiting about the Earth. More particularly, but not by way of limitation, it pertains to a system that uses shadows created by objects as they pass in front of the Sun or the Earth's Moon. Still further, the disclosed invention relates generally to a Sun-tracking or Moon-tracking passive space surveillance system; and, more particularly, to a system and method for detecting the presence and bearing of objects in space in response to the occlusion of Sunlight or Moonlight.

(b) Discussion of Known Art

A known approach at detecting space targets is disclosed in U.S. Pat. No. 5,410,143, to Jones titled "Space target detecting and tracking system utilizing starlight occlusion", which teaches the use of stars at night to detect the presence of space targets. The Jones system uses a catalog of known star locations to detect the presence of an object. With the Jones system, the presence of an object in space is indicated by the occlusion of known stars.

There are three significant disadvantages to the Jones approach which are as follows: (i) it depends upon the successive occlusion of stars for accurate detection; (ii) it places no practical limitations on the distance, or range, of detectable objects; and (iii) it does not reliably discern object size from object velocity.

The first disadvantage of the Jones method is that it depends on the successive occlusion of stars as the basis for its analysis for determining that there is an object somewhere between the Earth and each of the stars being used. In other words the disadvantage to this approach is that the occlusion of one star after the occlusion of another star lacks sufficient information to lead to the conclusion that a single object caused both (or a series of) occlusions.

The second disadvantage of the Jones system is that the distance between Earth and the stars being used is measured in light years. In other words, the distance from Earth to the nearest star (besides the Sun) is about 9,400,000,000,000 km. This great distance clarifies the problems of reliability associated with the use of stars that are visible at night, where there is a very high probability that something may cross somewhere along the line of sight between the Earth and the star, thereby creating a false alarm.

The third disadvantage of the Jones system is that it does not reasonably discriminate object size from object velocity. This is because, scientifically, starlight (stellar energy) consists of an extended array of points, with each point typically subtending an angle of 1/20 arc-sec or less. Therefore, an object passing in front of such a point source would typically totally eclipse it for a moment. In this situation it would be impossible to tell whether the length of time of the object-star eclipse was due to the objects apparent velocity or its size.

Accordingly, there remains a need for a reliable system that can be used to detect and track objects and other debris within the limited distance of 1AU (Astronomical Unit), or 150,000,000 km. Importantly, there remains a need for a reliable system that can be used to determine the size and velocity of detected and tracked objects and other space debris.

These needs can be met by the following described system which utilizes Sun or Moon occlusion. Both the Sun and Moon are astronomically close objects, at distances of 150,000,000 km and 381,000 km respectively. Therefore, observing occlusions of the Sun or Moon will allow the discrimination of space debris or other objects less then 150,000,000 km or 381,000 km from the Earth.

Because the Sun and the full Moon have equal size/distance ratios, both cover an average of 1800 continuous arc seconds of the sky. Therefore, space debris or other object shadows that move in front of the Sun or Moon will only partially eclipse the observed area as they move across these portions of the sky. This means that these object shadows will have clearly discernable size and velocity as they move across such a continuous source of background light as is present in the Sun or Moon.

Besides meeting these needs, the method of space target identification described here, has other distinct differences than the Jones method. Obviously, observation of the Sun and Moon as objects differs significantly from observation of stars in that the Sun and Moon do not require or benefit from association with a stellar catalog. In addition Sunlight observation is a daytime activity, and useful Sunlight observation never requires an image intensifier. The observation of Sunlight also introduces the useful characteristics of observing a continuous source of ultraviolet light which can be shown to markedly improve a telescope's resolving power. Similarly, the Moon, though only reflecting the Sun's light can also represent a continuous light source to an observer, especially in the case of a full Moon.

Therefore, a review of known devices reveals that there remains a need for a reliable system that can be used to monitor the sky for objects and/or debris that is above or enters the Earth's atmosphere, There remains a need for a system that can be used to passively track objects traveling above or through the Earth's atmosphere by simple continuous observation of either the Sun or Moon, all without the need for operator skill, such as would be required with normal telescopic observation and the like.

There remains a need for a system and method for detecting objects orbiting the Earth or objects that enter the Earth's atmosphere while using light sources within our solar system, such as the Sun as a useful primary source of light, and the Earth's full Moon as a useful secondary source.

SUMMARY

It has been discovered that the problems left unanswered by known art can be solved by providing a system for detecting objects that includes:

1. a receiver for collecting incident Sunlight (solar energy) or reflected Sunlight (e.g. Moonlight);

2. a light sensitive device that produces a signal in response to exposure to light; and 3. a signal processor that is coupled to the light sensitive device, the signal processor sensing the collected incident Sunlight and which is programmed for providing an output signal corresponding to provide a detection signal in response to a shadow that moves across the light sensitive device.

It is contemplated that the receiver will be a telescope that has an axis along which the lenses of the telescope act, or another device that can accept the image of the Sun. For example, if a simple cylinder is used, the axis of the cylinder should always be pointed to the center of the image of the Sun (Sun disc). According to a highly preferred example of the invention, the telescope or other device used to gather the image of the Sun is mounted on a support base that allows the receiver to follow the Sun, and thus maintains the axis of the cylinder or telescope substantially centered on the image of the Sun.

Furthermore, according to a highly preferred example of the invention, the light sensitive device that produces a signal in response to exposure to light is a charge-coupled device (CCD) that converts images into electrical impulses. However, it is important to note that it is contemplated that any other device of the type referred to in the art as Full-Frame Transfer or Frame-Transfer devices that use photocapacitors as light detectors or other devices that use photodiodes and capacitors as detectors may be utilized. A discussion of CCD devices is found in U.S. Pat. No. 6,069,658, incorporated herein in its entirety by reference.

The tracking of the Sun may be accomplished using one of many known systems, such as one of many standard telescope mounts, or the types of systems discussed in U.S. Pat. Nos. 4,585,318 and 4,295,621, both of which are incorporated herein by reference.

It is contemplated that the signal processor may be a data processor, such as the type found in personal computers, which takes the pixel information derived from the CCD device and analyzes the information as described in further detail below. The presence of "debris", which as used herein represents items that are orbiting, or traveling between the Earth and Sun, or between the Earth and the Moon.

It is further contemplated that the disclosed invention may be used as part of an ensemble, or arrangement for tracking debris, which includes several systems positioned at different geographic locations. With this type of an arrangement it is contemplated that the authenticity of debris detected by one system may be confirmed or excluded by the results of tracking by other systems in the same arrangement or ensemble. Accordingly, it is contemplated that the systems may communicate with one another or communicate with a centralized comparison unit that allows the information gathered from the various systems and then uses the information to confirm or exclude whether items identified as debris by one system is, in fact, debris.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

Figures 1, 1A:
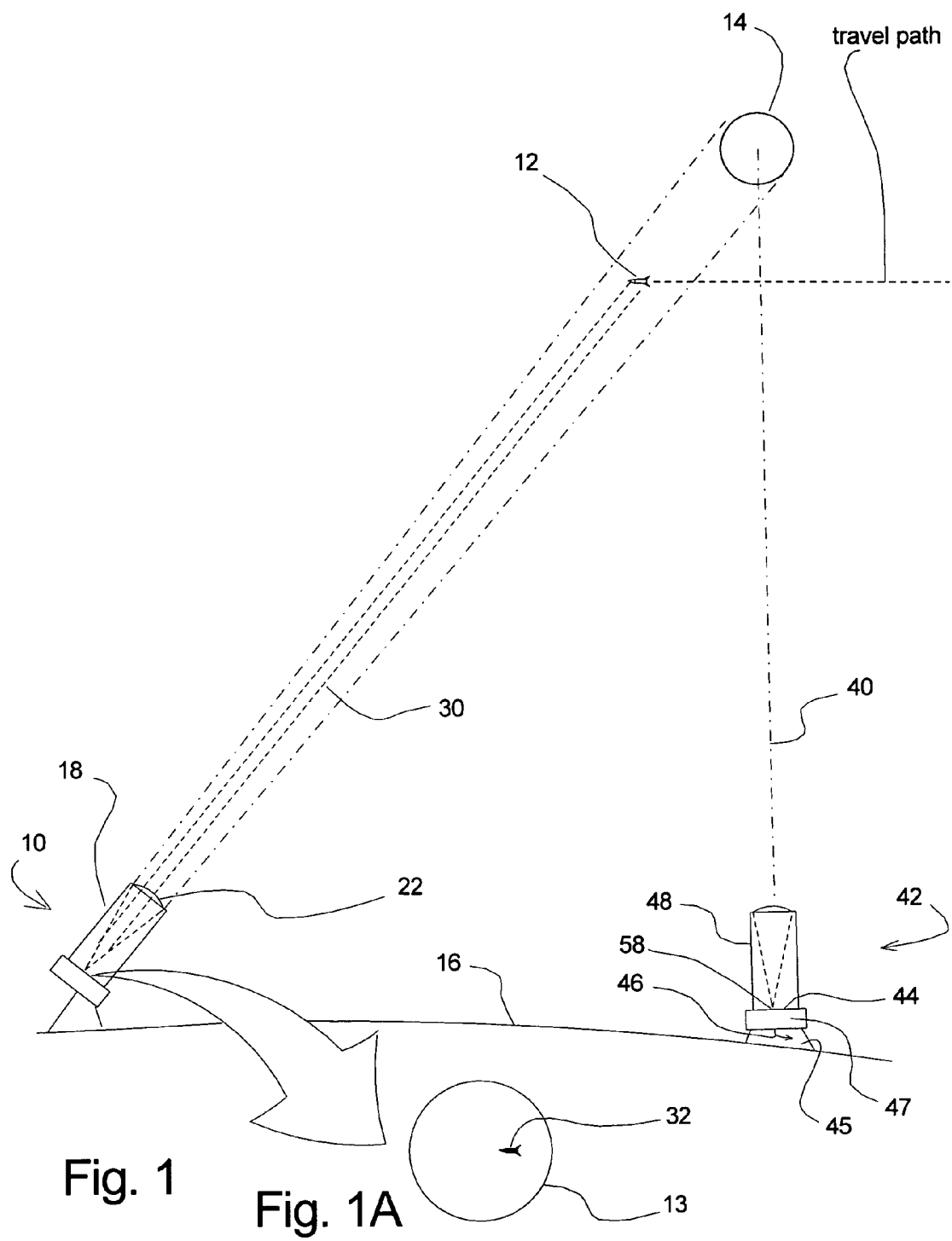
FIG. 1 illustrates an example of an arrangement or ensemble of systems in use.
FIG. 1A illustrates the image of the Sun projected on the sensor.
Figure 6:
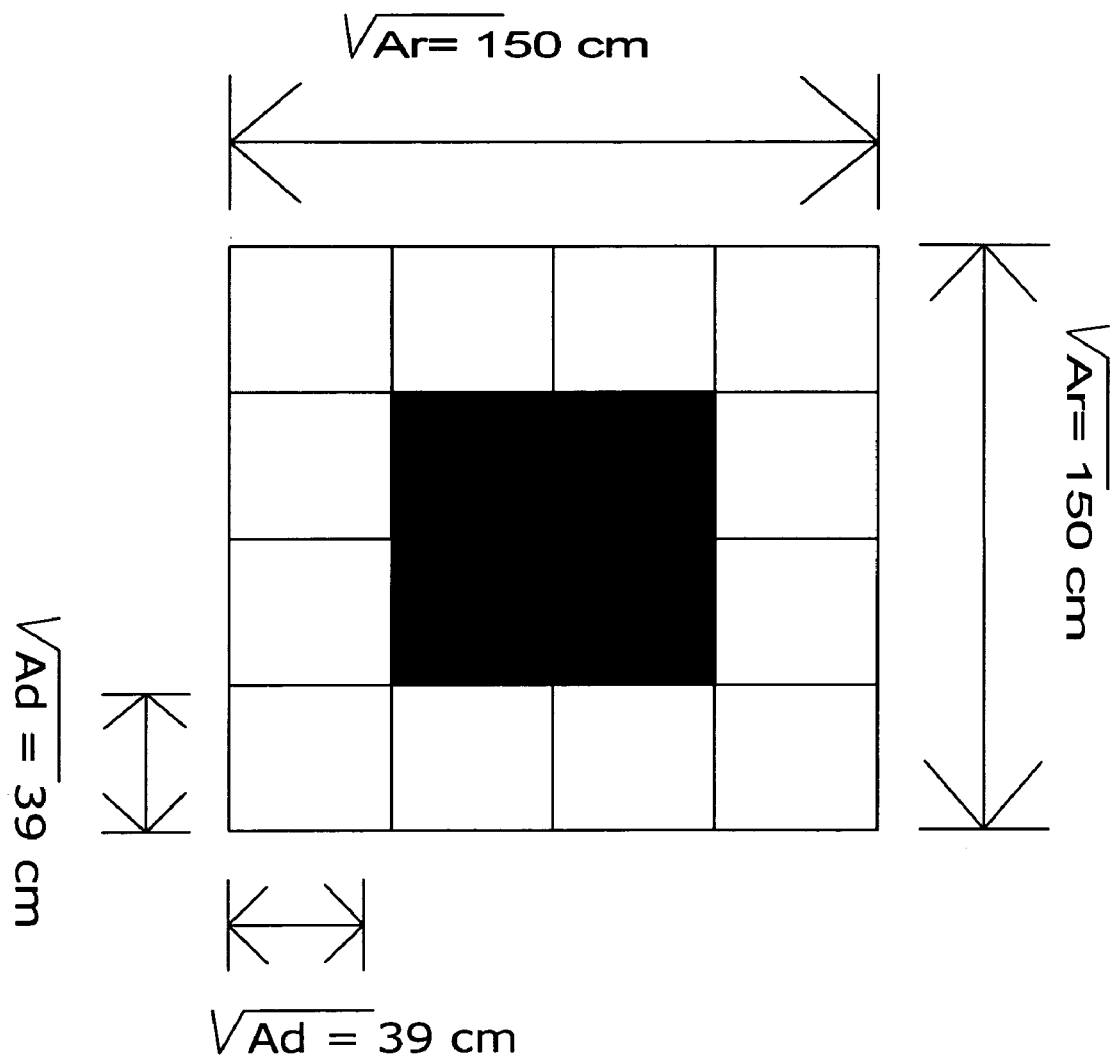
Figure 7:
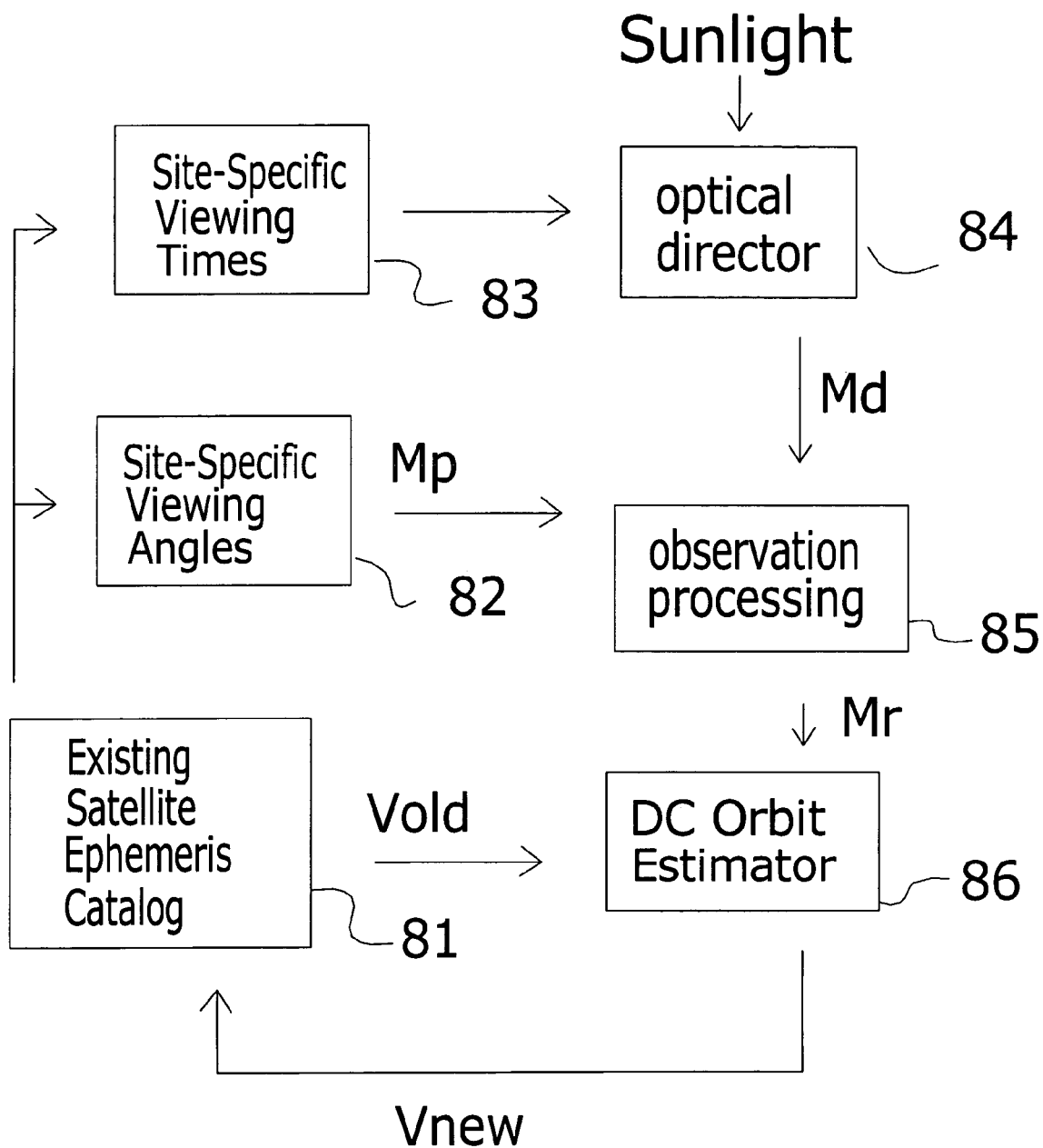
Figure 8:
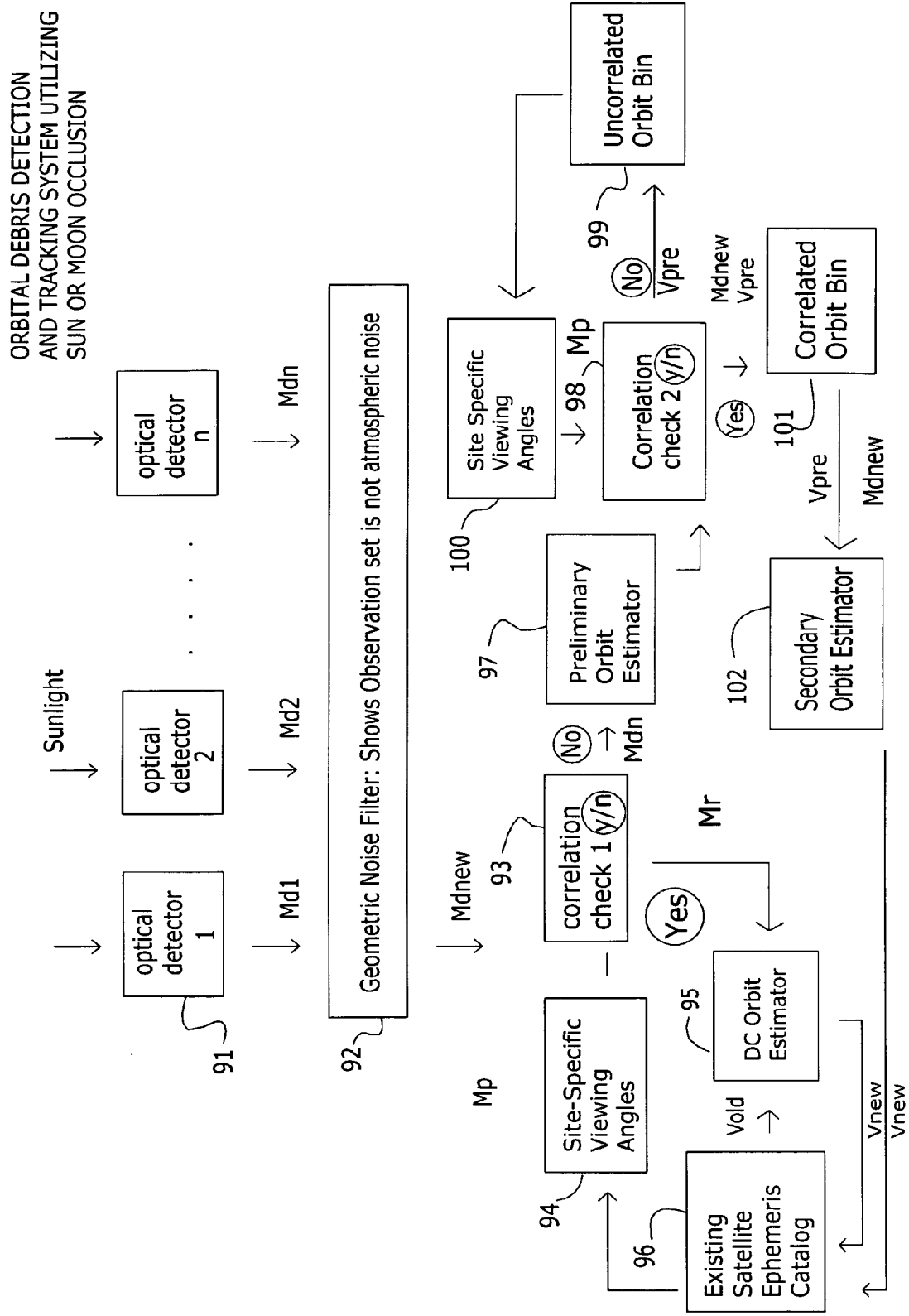
Figure 9:
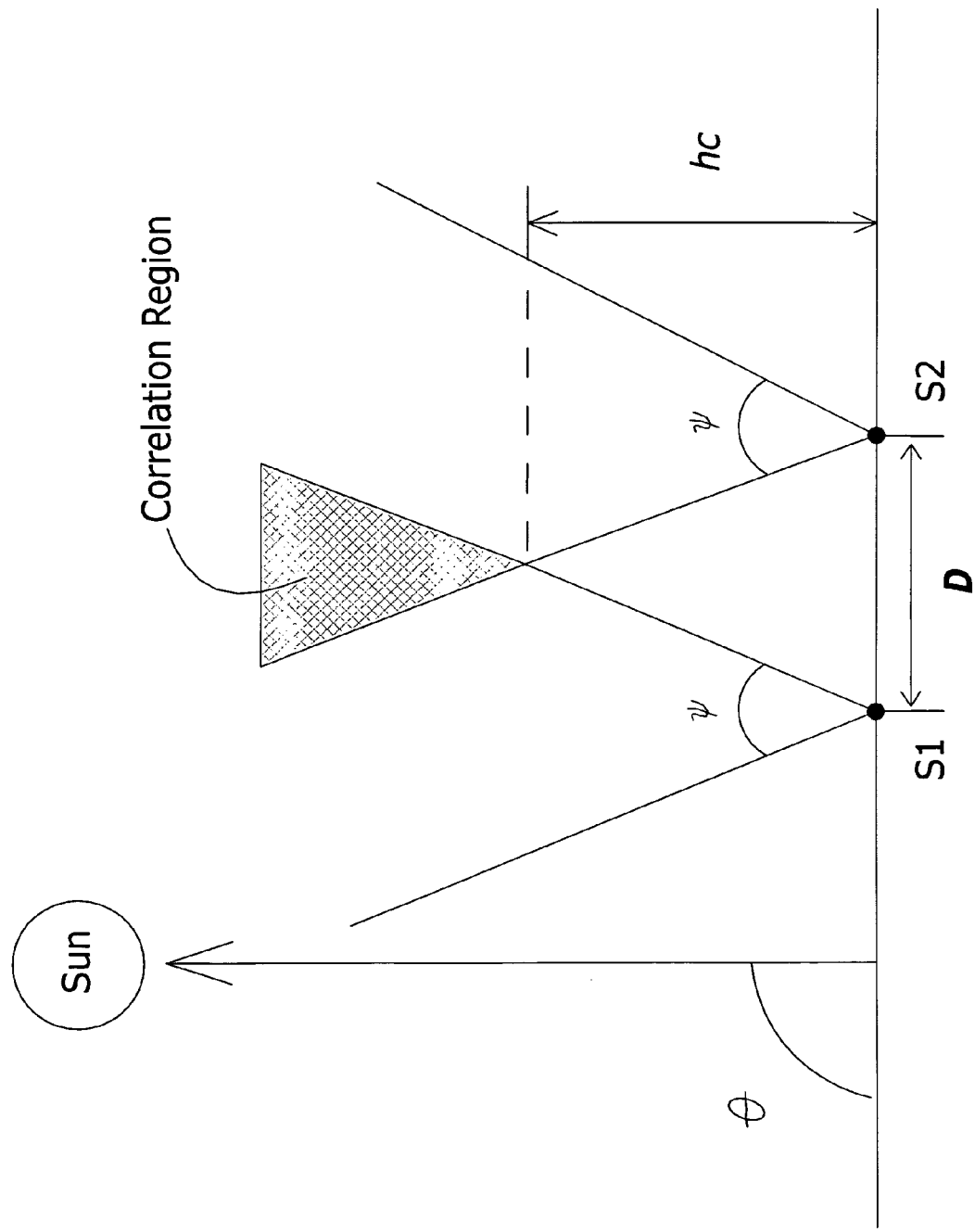
Figure 10:
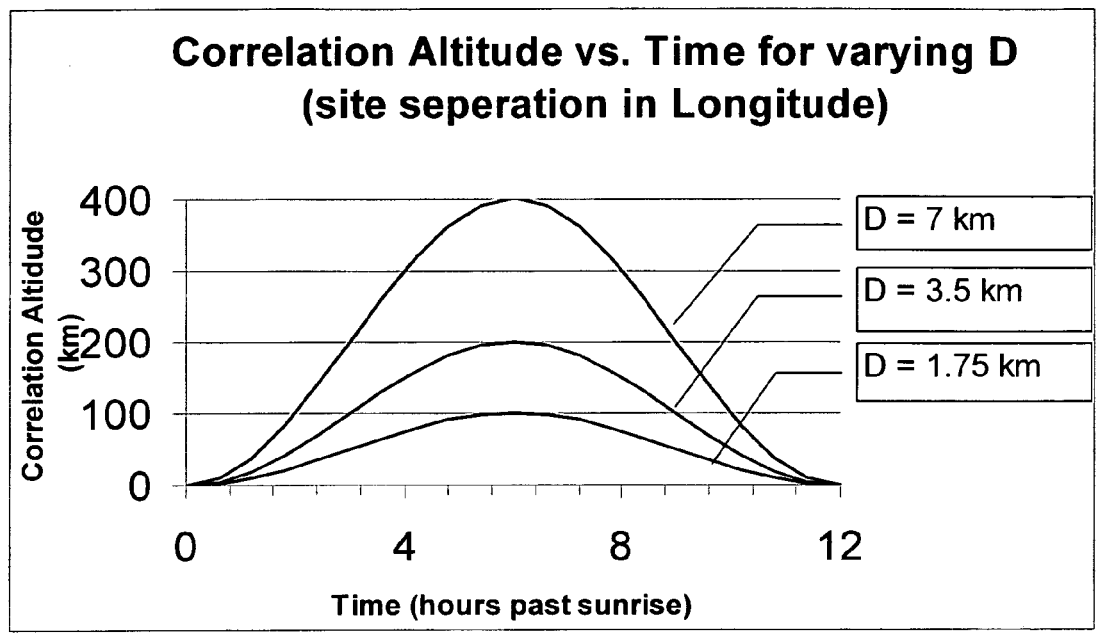
Figure 11:
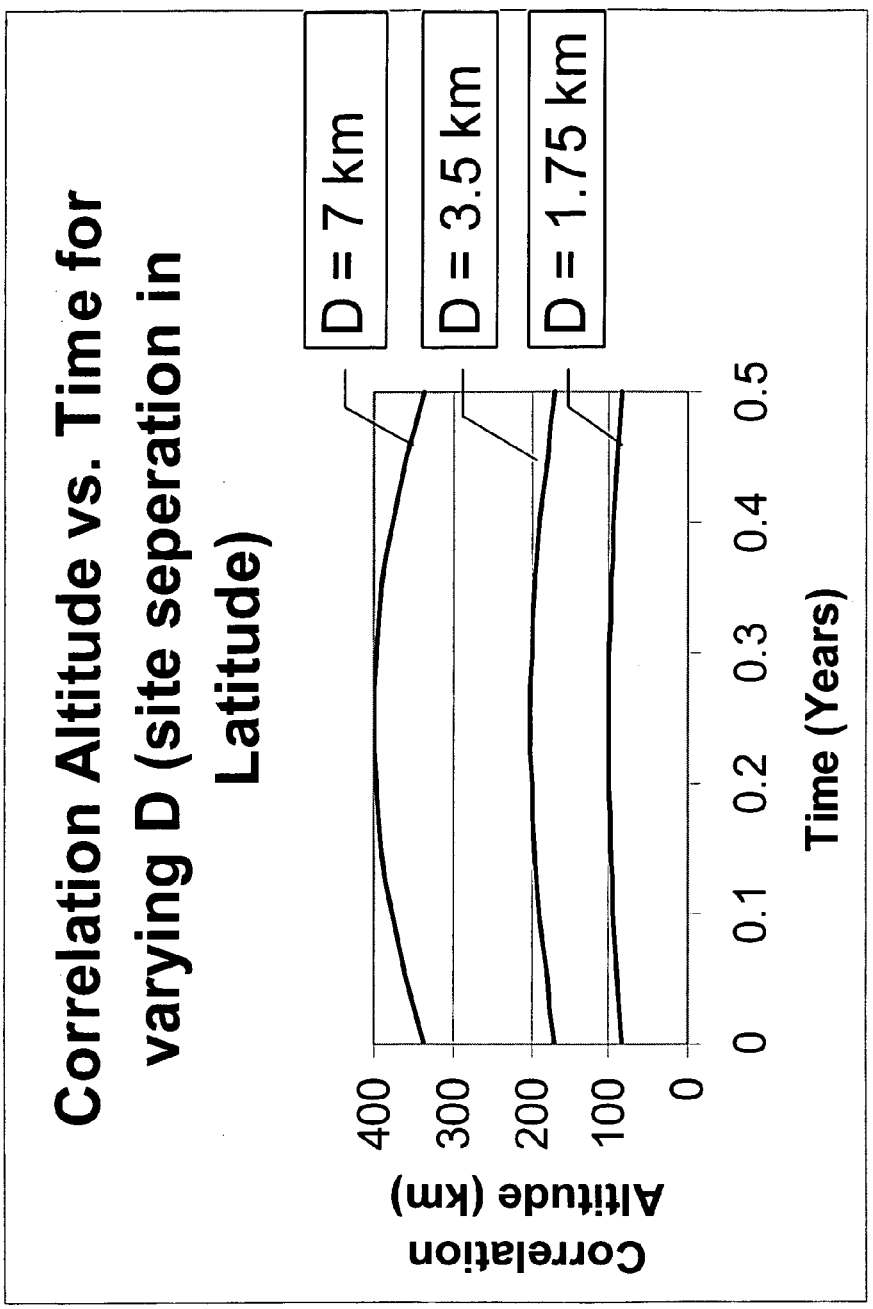

FIG. 6 illustrates a distinct third case of known area-error shadow detection FIG. 7 diagrams the flow-chart of a single sensor from FIG. 1 designed to track known objects as they occlude the Sun or Moon FIG. 8 diagrams the flow-chart of an ensemble of sensors from FIG. 1 designed to detect unknown objects as they occlude the Sun or Moon FIG. 9 illustrates how the observed area of two physically separate sensors geometrically impinge on each other FIG. 10 is a graph illustrating how two sensors separated in longitude will periodically impinge on each other during one day FIG. 11 is a graph illustrating how two sensors separated in latitude will periodically impinge on each other during one half year

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here; but rather the invention is intended to cover all alternative embodiments and modifications that fall within the spirit and scope of the invention as defined by the claims included herein, as well as any equivalents of the disclosed and claimed invention.

Turning now to FIGS. 1 and 1A where a system 10 for detecting objects 12 in space has been illustrated while in use. The disclosed system 10 is used to detect shadows of objects 12 as they move across a projected image 13 of the Sun 14 as viewed from the system's location on Earth 16. While it is contemplated that the disclosed system 10 may be used to detect objects between the system 10 and the Sun 14, it is contemplated that the system 10 will be particularly useful in detecting objects 12 of observed area >1 cm^2 above 300 km altitude, and possessing typical orbital velocities of 10–20 km/sec above the surface of the Earth 16.

Figure 2:
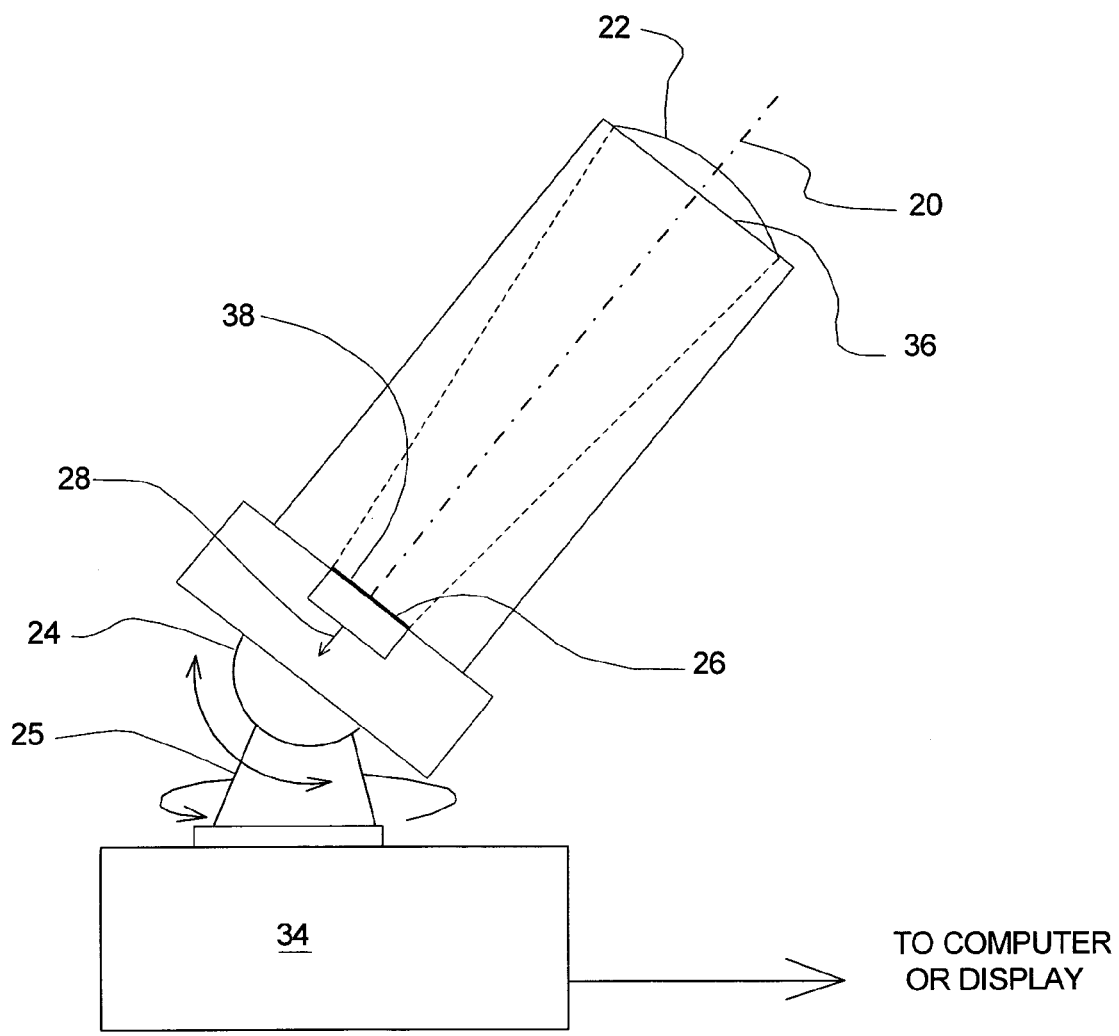
FIG. 2 is a cut-away side view of the disclosed system.

Turning to FIG. 2, it will be understood that a preferred example of the system 10 will include a light receiver, such as a first telescope 18. The telescope 18 includes an axis 20 and an objective lens 22. The image of the Sun 14 will be gathered through the telescope 18 while the axis 20 of the telescope 18 is pointed at the Sun or full moon 14. Accordingly, it is contemplated that the telescope 18 will be mounted on a support 24 that allows the use of a tracking system 25 that aligns the axis 20 of the telescope with the Sun or full moon 14.

Referring to FIGS. 1 and 2 it will be understood that the image of the Sun (light from the Sun projecting this image) will be gathered through the objective lens 22 and focused on a first sensor 26 that will be used for converting the light image into a set of electronic signals that can then be analyzed with the use of a computer or other processor. According to a highly preferred embodiment of the invention the sensor 26 is a charge-coupled device (CCD), which is a well-known type of device that is widely used to digitize images in digital cameras. Thus, the image of the Sun 14 when focused on the sensor 26 allows the sensor to create an output signal 28 that is representative of the image of the Sun 14, and which is indicative of the intensity of the sensed Sunlight.

Referring to FIGS. 1 and 2, when an object 12 passes between the system 10 and the Sun 14, an object shadow 32 will appear on the image 13 of the Sun 14 as identified by the sensor 26. As explained above, an output signal 28 that includes signals or information about the intensity of the light throughout the image of the Sun 14. The output signal 28 is then analyzed through the use of a signal processor 34 that has been programmed to interpret the variations in the intensity of the image 32 of the Sun 14. It is further contemplated that the signal processor 34, or the associated computing equipment, will be programmed for storing the information or signal 28 corresponding to the image of the Sun 14 at a point in time, and, then, comparing the sensor output signal to a recent sensor output signal corresponding to the image of the Sun focused on the sensor 26. It is contemplated that this comparison will allow the signal processor 34 to provide a target detection signal indicating whether the target object has passed between said receiver and the Sun. Additionally, the comparison of the images or signals corresponding to the different points in time will allow the system to identify moving "debris" or objects 12 as well as components of their velocity.

Still further, as illustrated in FIG. 2, it is contemplated that the system may also include an image filter 36 that will be used for reducing the energy of collected Sunlight to be focused on the sensor 26, or for passing only a specific visible or ultraviolet wavelength of light on the sensor 26. Preferably the image filter 36 has been adapted for transposing a focal plane image 38 of incident Sunlight onto the sensor 26, and thus improving the accuracy of the information retrieved from the sensor 26.

Figure 3:
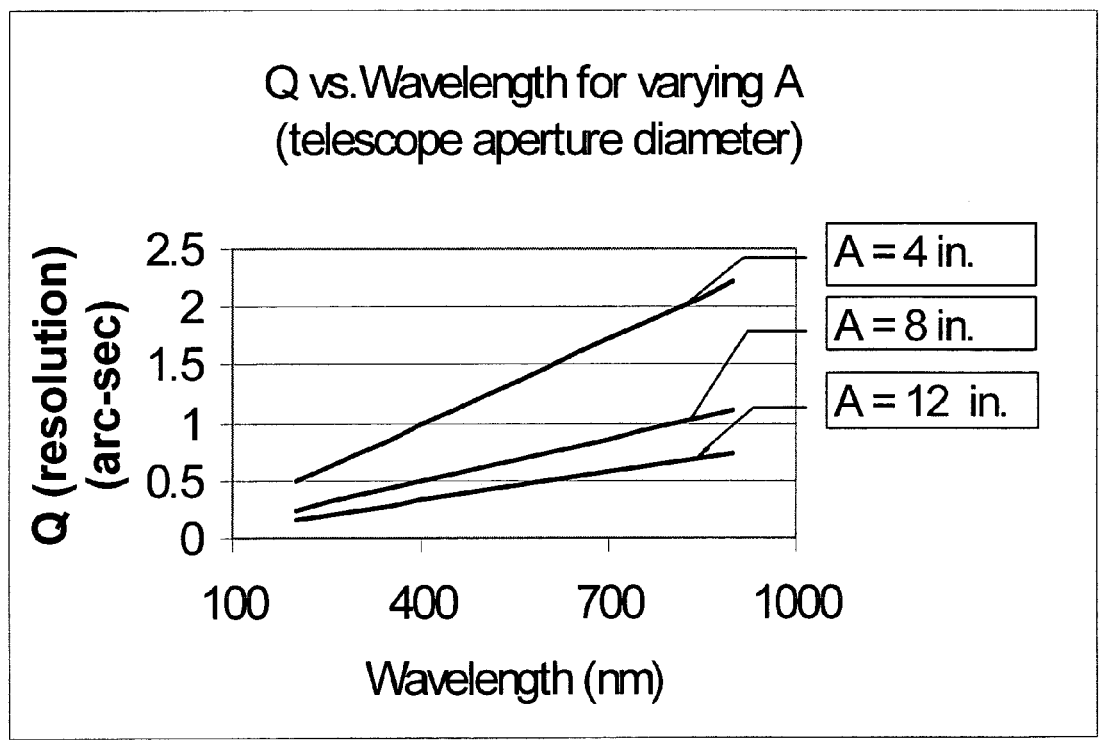
FIG. 3 is a graph illustrating the relationship the ideal observability of an object versus the wavelength of detected light for various telescope sizes

Referring to FIG. 3, a graph of telescope resolution (Q) vs. observed wavelength of light demonstrates the first optical advantage inherent in a system designed to detect Sun occlusion. This optical advantage is that of short wavelength, or ultraviolet light, observation, and it is realized by observing a continuous source of ultraviolet radiation such as the Sun.

The phenomenon of short wavelength observation is expressed in a well known equation of telescope optics, which affects the design of the components of the disclosed system 10. This experimental equation estimates the maximum angular resolving power of a telescope, Q, as a function of $\lambda$, the wavelength of light, and A, the diameter of the objective lens 22.

$$Q = 2.5e5 * \lambda / A \qquad 1$$

Here Q is measured in arc seconds, $\lambda$ is the wavelength of light measured in m (meters), and A can represent either the diameter of the optical glass, or the diameter of the light-reflecting surface, measured in m.

FIG. 3 shows how Q from equation 1 depends on $\lambda$ with different values of A. From equation (1), it appears that ultimately the size of the telescope aperture will act as the limiting factor in determining the sensitivity of the disclosed system 10. However, it must also be noted that the resolving power of the disclosed system 10 can be improved linearly by measuring a shorter wavelength, such as an ultraviolet wavelength, of light. One important capability inherent in this disclosed system 10 is the improvement of Q by sampling ultraviolet light (~200–300 nm) present in Sunlight.

It should now be noted that with a given value of Q, the total resolved circular area $A_R$ at a given altitude, H, can then be determined as a function of Q. Here H is the height or observed distance of the object or space debris.

$$A_R = \pi * (\tan(Q) * H / 2)^2 \qquad 2$$

Even in the case where visible light (400–700 nm) is used in a telescope-detector to achieve a typical 1 arc second resolution (Q), it will know be shown how the configuration described here achieves an additional optical advantage termed 'known area-error shadow detection'.

Figure 4:
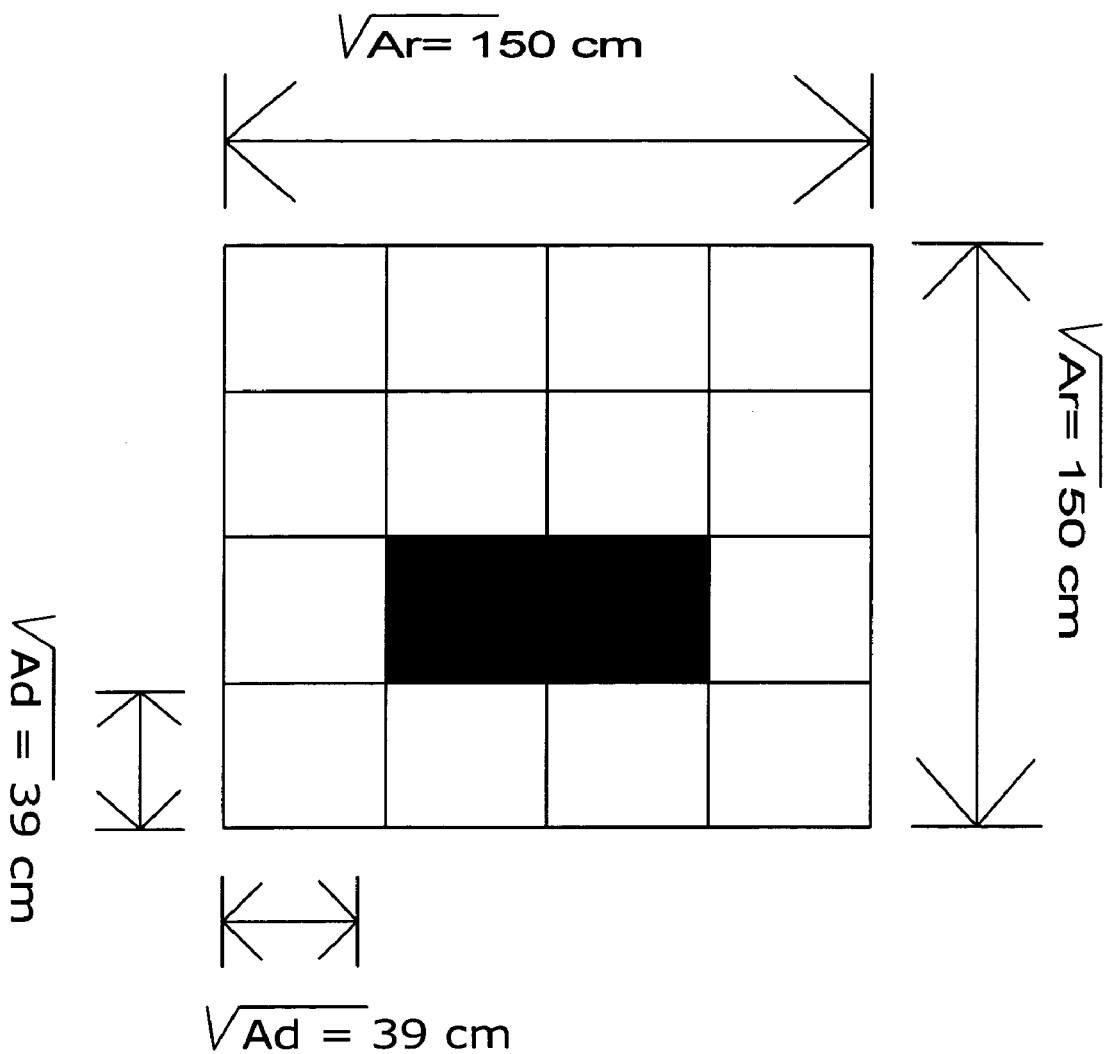
FIG. 4 illustrates the use of known area-error shadow detection while detecting debris with a single CCD pixel.
Figure 5:
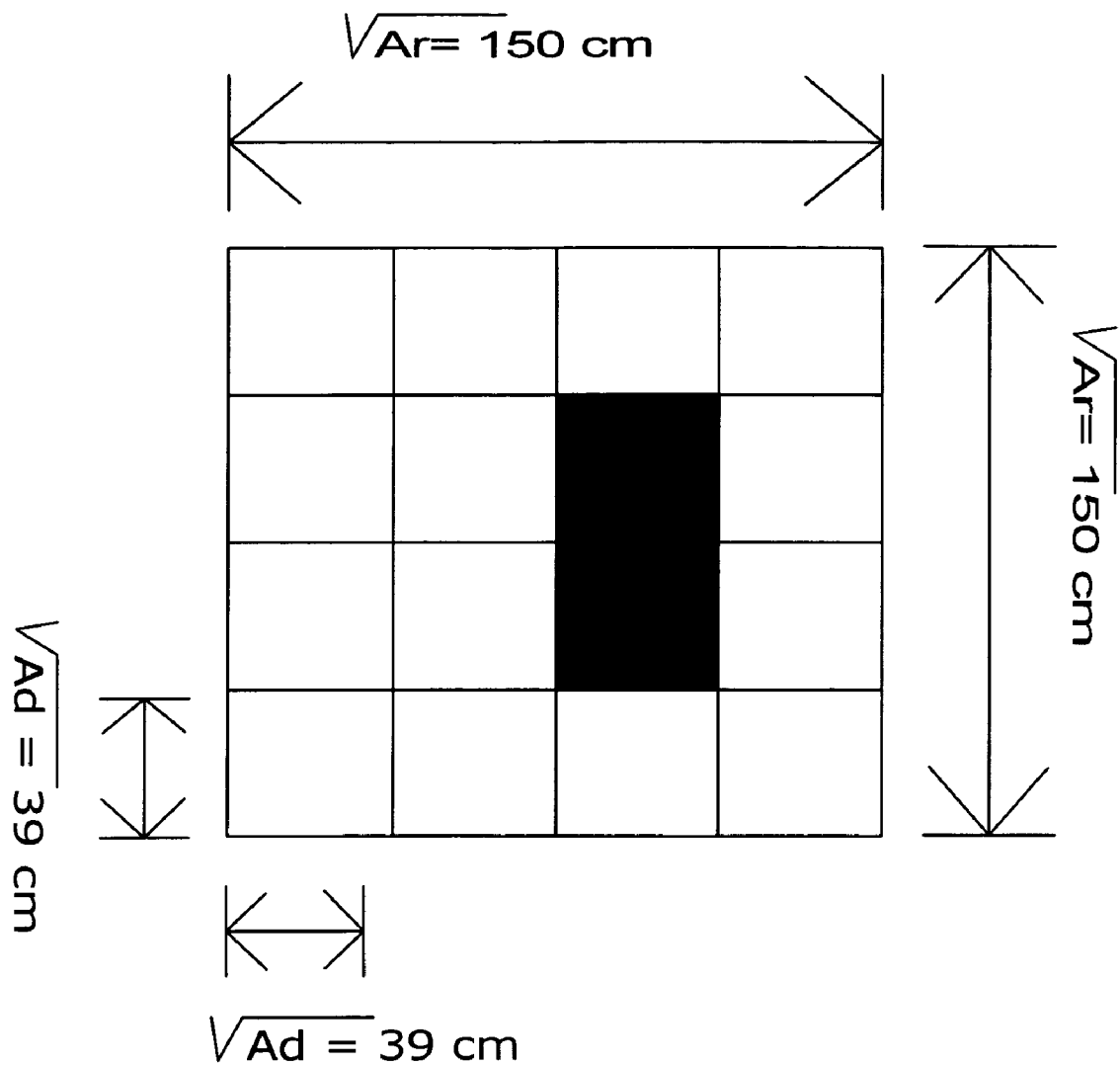
FIG. 5 illustrates a different but importantly indistinguishable case to that in FIG. 4

Referring to FIGS. 4 to 6 an example of known area-error shadow detection shows that the telescope and detector, 10 will be able to resolve an object shadow smaller than its achievable Q with a known area error. This is made possible by measuring the intensity change of a continuous light source to determine the occlusion of a known or unknown object. This possibility exists because during a very fast sampling time we can expect a definitive dark shadow to be present against the observed illuminated background (Sun or Moon), and this will directly relate to the relative intensity of the resolved sampled area. The following two equations show how known area-error shadow detection can be accomplished in the preferred embodiment with a digitally sampled CCD.

$$A_d = A_R / (N_{BIT\ RESOLUTION} - N_{BIT\ NOISE}) \qquad 2$$

$$A_e = A_R - A_d \qquad 3$$

Here $A_d$ is the smallest detectable object area, which is a function of $N_{BIT\ RESOLUTION}$, the total number of digital bits that the light detecting device or CCD can distinguish, and $N_{BIT\ NOISE}$ is the bit level of the typical noise in the sensor. To elaborate, $N_{BIT\ RESOLUTION}$ for a 4 bit sensor would be 16, and $N_{BIT\ RESOLUTION}$ for a 12 bit sensor would be 4096. $A_e$, area-error, is then the remainder of the difference of the total resolved area and the minimum detected area.

FIGS. 4 to 6 describe an example of known area-error shadow detection. Consider a 1 arc-sec Q that can be typically obtained from a 6 in., or 0.15 m telescope observing green wavelength light (~500 nm) from equation 1. At an altitude of 350 km, equation 2 shows that this 1 arc-sec Q value resolves an $A_r$ of 225 cm^2, which can be represented by a square area of dimensions 150 cm* 150 cm.

In this example it is assumed that the achieved $A_R$ of 150 cm* 150 cm is projected on to a single 4-bit CCD pixel, or a similar light sensitive element. The pixel therefore has an $N_{BIT\ RESOLUTION}$ of 16 ($2^4$ bits), or 16 distinguishable light levels. If we then assume that the pixel has an ideal low level noise $N_{BIT\ NOISE}$ of 1, then equations 2 and 3 can be solved to show that this example can actually detect an object area Ad as small as 39 cm*39 cm with a known area-error of 145 cm*145 cm. FIGS. 4 and 5 show how two different 39 cm*39 cm object are both observed with known area errors of 145 cm*145 cm.

FIGS. 4 and 5 illustrate the 16-bit level resolution of a single pixel as 16 squares over a 150 cm*150 cm area. Geometrically then, each of the 16 squares is actually 37.5 cm* 37.5 cm, which would be the detected area $A_d$ if $N_{BIT\ NOISE} = 0$. In this case however, $N_{BIT\ NOISE} = 1$ bit. Then FIG. 4 shows 2 dark squares representing a 2 out of 16 total bit detection, which corresponds to the minimum detected area of 39 cm*39 cm with a known area-error of 145 cm*145 cm. FIG. 5 represents a different detection scenario, but with the same 2 bit output and therefore the same detected area of 39 cm*39 cm with a known area-error of 145 cm*145 cm.

When an object with an observed area greater than $A_d$ is detected it will be distinguished by registering a larger bit count for instance see FIG. 6. Here a 4/16 bit count registers a square object of dimensions 86 cm*86 cm with a known area-error of 122.5 cm*122.5 cm. Therefore, even when the disclosed system 10 is constrained by its achievable resolving power, Q, it can still use the novel attributes of short wavelength detection, and known area-error shadow detection to resolve smaller objects more effectively.

Referring to FIG. 7 the process of the discussed detector as am isolated tracking unit is outlined. In this configuration the goal of the detector is to improve the preliminary orbit estimation, or predicted position and velocity vectors, of active or inactive targets, space debris, asteroids, or other objects. This is accomplished by taking actual observations of the desired object as it occludes the Sun or Moon.

FIG. 7 shows how this goal can be met, by starting with an (81) Existing Satellite Ephemeris Catalog, or a known database of predicted object positions vs. time. From this catalog predicted Sun or Moon occlusion events can be forecasted. This includes (82) Site Specific Viewing angles, or predicted azimuth and elevation observations, as well as (83) Site Specific Viewing Times, which indicate the approximate time a particular site could observe a satellite or space debris occlude the Sun or Moon. During this approximate time the (84) optical detector will be set to track the Sun or Moon. It should be noted that this (84) optical detector, or rapid shadow detector can be constructed in several ways. The two most significant engineering considerations in constructing this rapid shadow detector, or sensor 26 as generally referred to herein are the number of individual light sensors, and the sampling rate of these light sensors.

The number of individual light sensors in this case refers to the number of light sensitive pixels. The sampling rate refers to the number of measurements taken in one second. In each of these engineering considerations, the larger the number the better, and in each of these cases the existing technology of CCDs will be the determining factor.

Currently, there are four proposed systems which can accomplish rapid shadow detection
1) Staring Array
2) Scanning Array
3) Circumferential Detector
4) Triggered Tracking element A Staring array will cover the entire area of the Sun or Moon, at the given sampling rate for a given resolving power.

A Scanning Array will take advantage of the high sampling rate and relative low cost of a line scan CCD. With typically faster sampling rates than area array CCDs, line scan CCDs can be used to scan over the surface of the Sun or Moon by sampling linear bands. This would require a mechanical or non-mechanical deflection mechanism, such as a mechanical piezoceramic deflection mirror, or a non-mechanical acousto-optic deflector.

A Circumferential Shadow Detector is useful for the purpose of target detection because sampling the circumference of the Sun is much easier then sampling the entire observed area, and a circumferential detector still ensures the detection of any object that enters or leaves the observed area, which in this case is the Sun or Moon. A circumferential detector could be designed around a ring of light sensitive detectors, or some mechanically or non-mechanically rotated light sensitive detector, which could sample light while traveling around, and tangent to the Sun or Moon's circumference.

Triggered tracking elements includes CCDs or other light sensitive devices mounted on one of many types of mechanical, or non-mechanical, devices which can actively track a shadow across the illuminated Sun background while recoding position and intensity observations.

As an object's shadow is detected by one of these methods (84), a series of observations vs. time are taking place. This leads to the creation of a matrix of detected observations, $M_d$. $M_d$ can include any number of azimuth, elevation, or object shadow magnitude readings over the time the object passes in front of the Sun or Moon. These azimuth and elevation readings can either be obtained with respect to the known ephemeris of the Sun or Moon, or with respect to the known pointing angle of the telescope. In either case these Azimuth and Elevation readings can benefit with accurate knowledge of the observing site's position (e.g. GPS).

Next the (85) observation processing module reads in the matrix of detected observations, $M_d$, and compares these values to the Matrix of predicted observations, $M_p$, which can be read from (82) the Site Specific Viewing Angles database. The (85) observation processing module, then takes the difference or residuals of these matrices and outputs these residuals in a matrix $M_r$, where $M_r = M_p - M_d$.

Finally (86) the DC, or Differential Corrections, Orbit Estimator can calculate a new orbit, or new vector, $V_{new}$, by applying the differential corrections process to the matrix of residuals, $M_r$, with the old vector, $V_{old}$, which is output by (81) the existing satellite ephemeris catalog. The differential corrections procedure is not explained here, but can be assumed to consist of the essential procedures documented in Bate, Mueller, & White. *Fundamentals of Astrodynamics.* 1971.

With the output of the updated or new vector $V_{new}$, this described method can continue indefinitely in a close loop process. $V_{new}$ then replaces $V_{old}$ in (1) the existing satellite ephemeris catalog, and it can be used to refine future predictions (82) and (83), and so on.

Now that the operation of an isolated sensor has been elaborated upon, it is useful to further contemplate that, in FIG. 1, in addition to the first disclosed system 10, a second identical system 42 that also includes a telescope 48, with an axis 40, which extends between the objective lens and the focus point of the objective lens, is used in conjunction with the system 10. It is contemplated that the second telescope 48 will be connected to a second tracking system 45 that aligns the axis 40 of the second telescope 48 with the Sun. Thus, the second tracking system 45 keeps the axis 40 of the second telescope 48 aligned with the Sun throughout the day.

The second telescope 48 will be connected to a second image sensor 44 that will sense the focused image of the Sun. Like the sensor 26, the second sensor 44 will provide a second sensor output signal 46 that will be used to indicate the intensity of the sensed Sunlight representing the image of the Sun collected through the second telescope 48.

Like the first sensor 26, it is contemplated that the second sensor 44 will be connected to a second signal processor 47, so that the target object is confirmed by comparing the object shadow obtained through the first telescope 18 and the first sensor 26. By using a pair of telescopes and the associated sensors, an ensemble or network can be formed for continuously monitoring the sky between the various telescopes of the ensemble and the Sun. The use of multiple telescopes will allow the system to eliminate errors by comparing the location and velocity information associated with a particular element of debris detected though one of the telescopes of the ensemble.

In comparison to FIG. 7, FIG. 8 now outlines the very useful features of an ensemble of geographically separate sensors, employed for the goal of detecting unrecorded space debris, and determining their vectors, or orbital characteristics, by observing the debris occlude the Sun or Moon.

This process begins with (91) an ensemble or array of optical detectors distributed over a given area, and set to simultaneously stare at the Sun as it traverses the sky from horizon to horizon. The two key useful features of such an ensemble, is that it introduces the option of (92) a geometric noise filter to distinguish only objects outside the atmosphere, and it allows 2 or more independent sites to improve orbit determination by triangulating observations.

In (91) the ensemble of optical detectors, produce independent observation detection matrices $M_{d1}$ to $M_{dn}$, which are input into (92) the Geometric Noise Filter. This filter functions by throwing out atmospheric noise, such as all observations below a 100 km altitude. FIG. 9 shows how such a filter is possible.

FIG. 9 diagrams a 2 dimensional cross section of the Earth's surface, which is here considered without curvature. The horizontal axis represents the Earth's surface, and the vertical axis represents altitude above the Earth. Two sensor sites, $S_1$ and $S_2$ each with a viewing angle $\psi$, are placed a distance D apart. The FIG. 9 diagram shows how $S_1$ and $S_2$ will have a correlation region, which is present above some altitude $h_c$. This is always possible, because $S_1$ and $S_2$ both view the same object (either the Sun or Moon) with the same viewing angle, $\psi$, of approximately 1800 arcsec. Now the following relationship can be proved through trigonometry:

$$h_c = D * \frac{\sin(\alpha - \theta) * \sin(\alpha + \theta)}{2 * \sin\psi} \quad (4)$$

Here $\alpha=(\pi/2-\psi)$, and $\theta$ is the angle between the represented Earth's horizontal surface and the Sun or Moon. Therefore $h_c$ for two sites can be determined as a function of the site separation distance, D, and the Sun or Moon angle $\theta$. In the case of the Sun, equation 4 can be further elaborated in the specific cases where the sites are separated in either latitude or longitude. In the case of a longitude separation, two sites will both perceive a daily Sun angle change from 0 to $\pi$ during the period of Sunrise to Sunset.

FIG. 10 graphs how equation 4 relates $h_c$ to a daily Sun angle change from 0 to n, during an ideal 12 hour day. Note how this correlation altitude changes during the course of a 12 hour day, from Sunrise to Sunset, and how for three cases it depends on site separation distance, D. It is straightforward to assume that knowing the time of day and separation distance of two sites, will allow the determination of the correlation altitude. Therefore two or more sensors, 10, can distinguish between atmospheric noise, and orbital debris, by targeting a correlation altitude greater than 100 km or the height of the atmosphere.

FIG. 11 graphs a similar case to FIG. 10, but now the change in correlation altitude over the course of half a year is represented for two sensors separated in latitude. This graph is then the result of the Earth's yearly oscillation of +/− 23.5 deg with respect to the solar plane.

Thus the described geometric noise filter, (92), is able to throw out all detections that do not correlate to some minimum altitude, and only those observations that do pass this filter, $M_{dnew}$, will be allowed to pass. $M_{dnew}$ then undergoes a first correlation check (93), to determine if this set of geometrically correlated detections now correspond to a previously known satellite, space object, or space debris.

At (93), correlation check 1, $M_{dnew}$ is compared to possible sets of $M_p$, matrices of predicted detections. As in FIG. 8, $M_p$ is generated by (94), Site specific viewing angles, which is in turn driven by (96) an existing satellite ephemeris catalog. In the case that $M_{dnew}$ passes the correlation check 1 (93), then the residuals matrix, $M_r$ will be output, where again $M_r=M_p-M_{dnew}$. $M_r$ will then enter (95) a differential corrections orbit estimator (95) along with a basis vector, $V_{old}$ supplied by (96). With the appropriate convergence of this iterative solution to $V_{new}$, (95) then outputs $V_{new}$ to (96) as the more refined vector to aid in future prediction.

In the case where correlation check 1 (93) fails then the observed object can be considered a new detection, not fitting into the known satellite object catalog. In this case, the raw $M_{dnew}$ will be output into a preliminary orbit estimator (97). The purpose of module (97) is to arrive at an estimated vector, $V_{pre}$. There are several useful methods to accomplish this task. One particular method published in Bate, Mueller, White. *Fundamentals of Astrodynamics*. (1971) requires six independent measurements to estimate an object's orbit. This for instance would include Az and El measurements at three times from a single site to be sufficient to estimate the orbital characteristics after detection, but this is not to preclude the use of other algorithms to make this initial prediction.

Following (97), $V_{pre}$ and the raw observations, $M_{dnew}$ are output to (98) correlation check 2, which is designed to bin the raw data from different sites which correspond to the same detected object. When the first set of $M_{dnew}$ enters (98) it will fail the correlation check 2, and $V_{pre}$ will be output to (99) the uncorrelated orbit bin. At this point site specific viewing angles (100) can be predicted from $V_{pre}$, and their corresponding $M_p$, matrices of predicted detections, can be output back into (98). Now additional sets of $M_{dnew}$ can be compared to $M_p$. Those sets that meet the correlation criteria will pass the test, and all correlated vectors and raw observations can be output to (101) a correlated orbit bin. Here data can be binned based on its correlation to a single object detected at multiple sensors sites. Once enough correlated raw observations, $M_{dnew}$, have been collected in (101), then the bin can be emptied, by outputting $M_{dnew}$, and possibly their associated $V_{pre}$'s into (102) a secondary orbit estimator.

The secondary orbit estimator (102) can be considered to be an algorithm similar to (97) or possibly similar to (95) a DC orbit estimator, where $V_{pre}$ is the input basis vector. In any case, the output of (102) is intended to be $V_{new}$, the best predicted vector, for a previously unknown object. This $V_{new}$ is then included as a new object in (96) the existing ephemeris catalog. As in the previous examples, this will lead to new (94) site specific angles, and other predictions, in a closed loop process meant to further refine the vector.

In summary, the primary constraint of the disclosed system 10 is that of the oldest technology referenced here, that of telescope optics. However, with short wavelength observation, and known area-error shadow detection, the disclosed system 10 can overcome some of a normal telescope's limitations.

Weather is also a common constraint for telescopic observation, but with a fast sampling rate, some cloud cover could be overcome as sensor noise by using the disclosed system 10.

In addition to these advantages, the disclosed system 10 as an isolated sensor can be used to detect space targets for a maximum 12 hours a day, which is much longer that the operation time for typical nighttime optical detection processes. Still further, as the number of independent sites acting as an ensemble increases, there is practically no limit to the area of viewable sky, or the operating time of such an ensemble. An ensemble of sensors can be utilized by not only any number of fixed ground sites or towers, but can equally benefit by an ensemble of mobile platforms on the Earth, or mobile platforms above the Earth, such as powered aircraft, or unpowered aircraft such as balloons.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A system for using an image of the Sun or Moon for detecting and tracking objects traveling above or through the Earth's atmosphere, the system comprising:
   a receiver for collecting incident solar energy, as Sunlight, or reflected solar energy, as Moonlight, the receiver being within the Earth's atmosphere and programmed for following the Sun or Moon's trajectory relative to the Earth as viewed from within the Earth's atmosphere, so that the receiver collects images of the Sun or Moon as the sun or Moon is observed from within the Earth's atmosphere;
   a light sensitive device that produces a signal representing the image of the Sun or Moon; and
   a signal processor that is coupled to the light sensitive device, the signal processor sensing the collected incident Sunlight or Moonlight and is programmed for providing an output signal representing a plurality of pixels corresponding to the image of the Sun or Moon as projected on the receiver and programmed for providing a detection signal in response to an object shadow represented by varied intensity within the plurality of pixels within the image of the Sun or Moon as created by the light sensitive device.

2. The system recited in claim 1 wherein said signal processor further provides a signal indicating the presence, position, and bearing of a target object disposed between said receiver and the Sun or Moon.

3. The system recited in claim 1 wherein said system further comprises an image filter for focusing the image of the Sun or Moon on said light sensitive device as a continuous illuminated round area representing the image of the Sun or Moon with a determinable geometric center and perimeter.

4. The system recited in claim 3 wherein said image filter is adapted for maintaining a focal plane image of incident Sunlight or Moonlight on said light sensitive device as the position of the Sun or Moon varies relative to the system.

5. A system for detecting and tracking objects in space utilizing an image of the Sun or Moon as observed from Earth without requiring that the object to be in the Earth's shadow for detection, the system comprising:
   a first telescope fixedly mounted on Earth, the first telescope having an axis centered on the Sun or Moon and programmed to remain centered on the Sun or Moon a tracking system that aligns the axis of the telescope with the Sun or Moon as the location of the Sun or Moon varies relative to the first telescope;
   a first sensor for sensing the image of the Sun or Moon focused on the sensor by the telescope and for providing a sensor output signal comprising of a plurality of pixels representing an image of the Sun or Moon, the pixels indicating the intensity of the sensed Sunlight or Moonlight, so that an object shadow appearing on the image as one or more pixels of different intensity within the plurality of pixels representing image of the Sun or Moon will be detected as the presence of a target object between the Sun or Moon and the system;
   a signal processor, responsive to said first sensor output signal, the signal processor being programmed for storing the signal corresponding to one or more pixels of different intensity within the plurality of pixels representing the image of the Sun or Moon focused on the first sensor at a point in time and then comparing the sensor output signal to a recent first sensor output signal corresponding to one or more pixels of different intensity within the plurality of pixels representing to the image of the Sun or Moon focused on the sensor to provide a target detection signal indicating whether the target object has passed between said system and the Sun or Moon.

6. The system recited in claim 5 wherein said signal processor further provides a series of signals indicating the presence, position, and bearing of the target object disposed between said system and the Sun or Moon.

7. The system recited in claim 5 wherein said system further comprises an image filter focusing the entire image of the Sun or Moon on said first sensor.

8. The system recited in claim 7 wherein said image filter is adapted for transposing a focal plane image of incident Sunlight or Moonlight onto said first sensor.

9. The system recited in claim 5 and further comprising a second telescope having an axis towards the Sun or Moon, the second telescope being connected to a second tracking system that aligns the axis of the second telescope with the Sun or Moon;
   a second sensor for sensing the image of the Sun or Moon focused on the second sensor by the second telescope and for providing a second sensor output signal comprising a plurality of pixels representing the image of the Sun or Moon, the second sensor being correlated to the first sensor, so that the target object is confirmed by correlating the object shadow obtained through the first telescope and the first sensor.

10. A method for detecting objects in space utilizing a receiver for collecting an image of the sun or Moon without requiring that the object to be in the Earth's shadow for detection, the method comprising:
    providing and positioning within the Earth's atmosphere a first system comprising;
       a telescope having an axis of operation, the telescope being connected to a signal processor for sensing the image of the Sun or Moon focused on a sensor by the telescope, the image of the Sun or Moon being centered on the axis of operation of the telescope;
    following the Sun or Moon by moving the axis of operation of the telescope to maintain the image of the Sun or Moon centered on the axis of the telescope;
    creating a sensor output signal corresponding to the image of the Sun or Moon projected on the sensor as a resolved area defined by a plurality of pixels at a first point in time and identifying differences in pixel intensity as object shadows on the image of the Sun or Moon at the first point in time;

creating a sensor output signal corresponding to the image of the Sun or Moon focused on the sensor as a resolved area defined by a plurality of pixels at a second point in time and identifying differences in pixel intensity as object shadows on the image of the Sun or Moon at the second point in time;

comparing the object shadows from said sensor output signal from the resolved area at a first point in time with the object shadows from the output signal from the resolved area at the second point in time, and selecting at least one target object based on the comparison of the object shadows; and collecting location and movement observations of said target object from the object shadows in the resolved area to track the presence, position, and bearing of selected target objects.

11. A method according to claim 10 and further comprising the step of tracking the Sun by maintaining the axis of the telescope pointed at the Sun during daylight hours, and the step of tracking the Moon by maintaining the axis of the telescope pointed at the Moon during nighttime hours.

12. A method according to claim 11 and further comprising the step of correlating the movement of the target object with sensor locations and pointing angles, and accounting for the rotation of the Earth.

13. A method according to claim 10 and further comprising providing an ensemble of systems comprising:

a plurality of telescopes having axes of operation, each of the telescopes being connected to signal processors for sensing the image of the Sun or Moon focused on the sensor by the telescope and for providing a sensor output signal, the image of the Sun or Moon being defined by a plurality of pixels centered on the axis of operation of the telescope, the pixels being generated by the sensors; and positioning each system at a different distance from the first system for obtaining target object detection at multiple times and locations; and comparing the presences, locations, and bearings of the target object from one system to the target object from any and all other systems to correlate and confirm the target object presence, location, and bearing.

* * * * *